United States Patent Office 3,039,965
Patented June 19, 1962

3,039,965
ILMENITE-TYPE COMPLEX MANGANESE OXIDES
AND PREPARATION THEREOF
Thomas J. Swoboda, Wilmington, Del., assignor to E. I. du Pont de Nemours and Company, Wilmington, Del., a corporation of Delaware
No Drawing. Filed May 6, 1957, Ser. No. 657,053
8 Claims. (Cl. 252—62.5)

This invention relates to ferromagnetic crystalline oxides. More particularly, it relates to ferromagnetic cobalt and nickel manganese oxides and to the preparation thereof.

New ferromagnetic crystalline oxides of cobalt and/or nickel and manganese having an ilmenite-type crystal structure which are useful in many applications have recently been prepared (Toole U.S. Patent 2,770,523 and Swoboda U.S. Patent 2,996,457). These oxides of manganese with cobalt and/or nickel are particularly useful as the magnetic layer in magnetic recording tape and as coil core materials for use in electronic equipment. However, the methods for preparing these ilmenite-type oxides have required the use of very high pressures, i.e., pressures of at least 500 atmospheres. Consequently, heavy reaction vessels capable of withstanding such pressures must be used in the manufacture of these oxides by the heretofore known methods.

An object of the invention is, therefore, to provide new and improved methods for making ferromagnetic oxides of the type described.

Another object is to provide methods for preparing these oxides which do not require the use of high pressures.

The above-mentioned and yet other objects are achieved in accordance with this invention by a process which comprises heating at 450° to 800° C. in the presence of oxygen a mixture of a manganese salt with a nickel and/or cobalt salt, said salts being nitrates, oxalates, halides (i.e., chlorides, fluorides, bromides, and iodides), and carbonates, cooling the mass and separating from the same an ilmenite-type ferromagnetic complex oxide of manganese with nickel and/or cobalt. An embodiment of this process particularly useful in some instances is the employment of a mixed salt of manganese with cobalt or nickel instead of a mixture of two simple salts of these elements. Such mixed salts are generically comprehended in the term "mixture" as the term is used in this specification.

The examples which follow illustrate the process of this invention by the heating of mixtures of certain cobalt, nickel, and manganese salts. The process is, however, not limited to the use of these specific salts. Other salts that are operable include cobalt oxalate, cobalt carbonate, cobalt chloride, nickel fluoride, nickel bromide, nickel iodide, cobalt fluoride, and the like. Potassium permanganate is also suitable as the manganese salt, supplying, at the same time, necessary oxygen. Acetates, formates, and sulfates of cobalt, nickel and manganese can also be used when the reaction is carried out under a pressure of at least 200 atmospheres of oxygen. Salts of anions which contain no hydrogen are preferred since they consume less oxygen and are less likely to produce explosive mixtures.

The reactants used in the invention can be the ordinary grades of cobalt, nickel, and manganese salts commercially available. Best results are obtained with salts of highest purity.

Since the desired products are oxides, in the instant process some source of oxygen is, of course, essential. An amount of oxygen corresponding to at least 1.5 moles for each atom of manganese and group VIII element present is theoretically required. In the case of the preparation of nickel-manganese oxide, at least 1.5 moles of oxygen is required for one mole each of manganese and nickel to form the product $NiMnO_3$. An excess of oxygen is preferably used, however, and the excess is particularly important in the preparation of cobalt-manganese oxide. The oxygen can be provided by decomposition of part of the reactant salts or by an external source, e.g., air or oxygen can be passed over the reactant salts at atmospheric pressure. Air or oxygen can also be used to provide the selected operating pressure in a closed reaction system if it is so desired. When a mixed ilmenite-type oxide containing cobalt is being prepared, it is preferred to use an external source of oxygen providing a partial pressure of at least 50 atmospheres of oxygen in order to obtain the best yields of the desired ferromagnetic cobalt-manganese oxides.

The reaction of the manganese salt with a cobalt and/or nickel salt is conveniently carried out by gradually heating the mixture of salts up to a temperature of 450° to 800° C. during a period of time ranging from 1 to 6 hours, though shorter or longer periods may be employed. The reaction mixture is held at the operating temperature for one-half to ten hours or more. The time during which the reaction mixture is held at the operating temperature is not critical. Reaction temperatures of 550° to 750° C. for periods of time ranging from 1 to 3 hours are preferred since they give better yields of the desired ilmenite-type products.

The pressure at which the salts of manganese, nickel and/or cobalt are heated can range from atmospheric to 3000 atmospheres or more. From the practical standpoint, it is preferred to use pressures of 500 atmospheres or less. Atmospheric pressure is especially preferred for the preparation of nickel manganese oxide since reaction vessels capable of operation at atmospheric pressure need not be constructed as strongly as those for operation under high pressures. In the preparation of cobalt manganese oxides the preferred operating pressures range from 200 to 500 atmospheres. In the preparation of mixed cobalt-nickel manganese oxides, intermediate pressures are preferred, e.g., 50–500 atmospheres.

The heating of the reactant salts can be carried out as a single step or as a multistep process as desired. A two-step process is particularly convenient when the reaction is carried out under high pressure. In this embodiment, the mixture of salts, or the mixed salt, is heated up to an intermediate temperature, e.g., 200–400° C., at atmospheric pressure, the reaction mixture is then transferred to a vessel capable of withstanding high pressure, and a final heating at 450 to 800° C. is carried out as the second step. The two-step process permits the use of simple, light equipment for a major part of the heating cycle and the use of the high-pressure equipment for only a minor part of the heating cycle. This procedure results in more efficient use of the more expensive high-pressure equipment. Another advantage is that volatile constituents, e.g., water of hydration, can be eliminated during the first stage, thus reducing the pressure and volume requirement of the pressure equipment.

The proportions of reactant salts used in the process of this invention can be varied widely, atomic ratios of nickel or cobalt to manganese in the mixture of salts ranging from 1:1 to 1:2 being operable. Even wider ranges of proportions can be used, but it is preferred to use a ratio of 1:1 since this ratio gives satisfactory results.

When mixed cobalt-nickel-manganese oxides are being prepared, the mole ratios of the salts of these three metals can be varied over wide limits. It is essential that the manganese salt amount to between 15 and 85 mole percent of the total salt mixture, with the preferred range being between 50 and 70 mole percent of the manganese salt. The proportions of the cobalt and nickel salts can vary even more widely, amounts of either nickel or cobalt salts as low as 0.1 mole percent being operable. The chemical composition and physical properties of the magnetic product obtained under a given set of operating conditions are controlled to a great extent by the relative proportions of the cobalt and nickel salt in the reaction mixture. However, other factors such as temperature and the nature of the reaction medium employed also influence the composition and properties of the magnetic phase.

The conversion of the salt of manganese, cobalt, and/or nickel to the ilmenite-type mixed oxides can be accomplished in the absence of any reaction medium, or carried out in the presence of an aqueous medium or of an inorganic fluxing agent if desired. A suitable aqueous reaction medium may be either water alone, a dilute aqueous solution of an inorganic acid, e.g., nitric acid, or a dilute aqueous solution of an inorganic base, e.g., sodium hydroxide. The proportions of aqueous medium employed are not critical. Proportions ranging from 1 to 10 or 12 times the weight of the reactant salts can be used if desired.

In the optional embodiment of this process employing a fluxing agent, the heating is carried out in the presence of any inorganic composition, preferably a salt, that promotes the fusion of the reactant salts. Examples of specific fluxing agents that can be used include lithium fluoride/sodium fluoride (38%/62%), lithium fluoride/lithium sulfate (15%/85%), boric acid, sodium tetraborate, potassium persulfate, sodium nitrate, aluminum chloride, potassium acid sulfate, sodium hydroxide, potassium hydroxide, boric oxide, lithium nitrate, and lithium fluoride/potassium fluoride eutectic mixture.

It will readily be understood that where a flux or an excess of any solid reactant is employed, an additional step of separating the product from the nonmagnetic matter may be desirable. Washing with a solvent for the nonmagnetic material may be satisfactory in some instances. In others, comminuting the entire product mass to a powder and extracting the ferromagnetic particles with a magnet may be used. Other separation methods may, however, also be employed. An aqueous reaction medium can obviously be removed by filtration.

The reaction can be carried out in various types of reaction vessels, depending on the particular reaction pressures being employed. At atmospheric pressure the reaction is conveniently carried out in equipment made of heat-resistant glass. When the reaction is carried out under superatmospheric pressures, the reaction vessel can be constructed of corrosion-resistant metal, e.g., platinum, which can be placed in a reaction vessel capable of withstanding high pressures, e.g., pressures up to 3000 atmospheres or more.

The process of this invention is illustrated in further detail in the nonlimiting examples which follow. In these examples, the proportions of ingredients are in parts by weight and pressures are essentially atmospheric unless otherwise noted.

Example 1

A mixture of 8.73 parts of nickel nitrate hexahydrate and 10.74 parts of a 50% aqueous solution of manganese nitrate is placed in a heat-resistant glass tube in an electric furnace. The temperature of the furnace is raised to 680° C. in 2.25 hours and is maintained at 680–710° C. for 3.16 hours. The tube is then removed from the furnace and cooled. Oxygen is passed through the tube during the entire heating and cooling cycle. The product comprises 4.66 parts of a brownish-black, strongly magnetic, solidified froth which is shown by X-ray examination to possess the ilmenite-type crystal structure characteristic of $NiMnO_3$. This product has a Curie temperature of 160° C., a saturation induction, $B_s$, of 845 gauss and an intrinsic coercive force, $H_{ci}$, of 211 oersteds.

The treatment of a mixture of nickel and manganese nitrates by the procedure of this example, with the single exception that an atmosphere of nitrogen is used instead of oxygen, produces only a nonmagnetic product.

Example 2

The process of Example 1 is repeated with the exception that the mixture of manganese and nickel nitrates is heated at a temperature of 450–495° C. for 3.25 hours in an atmosphere of oxygen. The resulting product is a dark brownish-black nickel manganese oxide, $NiMnO_3$, amounting to 4.63 parts. This product is ferromagnetic.

Example 3

A mixture of 1.46 parts of nickel nitrate hexahydrate and 3.58 parts of a 50% aqueous solution of manganese nitrate is hermetically sealed in a thin-walled platinum tube, which is then placed in a pressure vessel. A pressure of 2500 atmospheres is applied by injection of water and the vessel is heated to 700° C. During the heating the pressure rises to a maximum of 3075 atmospheres. The temperature is held at 700° C. for 3 hours. The assembly is cooled, the pressure released, and the platinum tube is removed and opened. The solid product is washed thoroughly with water and separated into magnetic and nonmagnetic fractions by agitation in an aqueous suspension in a magnetic field of about 3000 gauss. A magnetic phase amounting to 0.62 part is obtained. This fraction exhibits a Curie temperature of 153° C., and X-ray examination demonstrates the presence of the ilmenite-type crystal structure.

Example 4

One part of mixed nickel manganese oxalate, prepared as described below, together with 0.83 part of lithium sulfate and 0.15 part of lithium fluoride, are heated in a glass tube in an electric furnace in an atmosphere of oxygen at a temperature of 650–700° C. for 3.25 hours. The product, after washing with water to remove the fluxing agent, is a gray, magnetic solid amounting to 0.51 part. Magnetic separation produces 0.17 part of magnetic phase which is shown by X-ray examination to have the ilmenite-type crystal structure characteristic of $NiMnO_3$.

The mixed nickel manganese oxalate used in Example 4 is prepared as follows: A mixture of 23.8 parts of nickel chloride hexahydrate and 19.8 parts of manganese chloride tetrahydrate is dissolved in 500 parts of water. The solution is heated to boiling and a solution containing 36.8 parts of potassium oxalate monohydrate in 200 parts of water is added dropwise. After the addition is complete, the mixture is cooled and filtered. The solid obtained is washed several times with water and dried.

*Anaylsis.*—Calcd. for $NiMn(C_2O_4)_2 \cdot 4H_2O$: Ni, 16.23%; Mn, 15.20%. Found: Ni, 16.74%, 16.73%; Mn, 13.92%, 14.58%.

Example 5

A mixed carbonate of nickel and manganese is prepared as follows: A mixture of 7.12 parts of nickel chloride hexahydrate and 5.94 parts of manganese chloride tetrahydrate is dissolved in 100 parts of water. To this solution is added dropwise a solution of 6.36 parts of anhydrous sodium carbonate in 100 parts of water. The precipitate that forms is allowed to settle and the supernatant liquid is decanted. The product is washed on a filter several times with water, then with acetone, and is finally air dried.

The mixed carbonate is broken up into small lumps and is charged into a glass tube which is placed in an electric furnace and heated at a temperature of 640–700° C. for 3 hours. A stream of oxygen is passed through the tube during this period of heating. The resulting product is a dark gray, magnetic powder amounting to 4.19 parts. X-ray examination shows the presence of the ilmenite-type oxide, $NiMnO_4$, as the major phase, together with smaller amounts of $NiO$ and $Mn_2O_3$.

Example 6

A platinum tube is charged with 0.117 part of potassium permanganate, 0.220 part of manganese chloride tetrahydrate, 0.439 part of nickel chloride hexahydrate, 0.207 part of sodium hydroxide, and 0.621 part of water (the sodium hydroxide and water being charged as a 25% sodium hydroxide solution). The tube is sealed and then heated at 625° C. under 3000 atmospheres' pressure for 2 hours. After cooling and removing the product from the platinum tube, there is obtained 0.30 part of product consisting of a lustrous crystalline magnetic solid and a fibrous brownish-black nonmagnetic solid. X-ray analysis of the magnetic phase reveals a very strong ilmenite-type pattern which shows the presence of $NiMnO_3$. The nonmagnetic phase exhibits a strong nickel oxide pattern and a weak manganese dioxide pattern.

Example 7

A mixture of 8.73 parts of cobalt nitrate hexahydrate and 10.74 parts of a 50% aqueous solution of manganese nitrate is heated in a glass tube in an electric furnace at atmospheric pressure and a temperature of 500–575° C. for 3 hours. A current of oxygen is passed through the tube during this period. The resulting product is a black, magnetic solid which is shown by X-ray examination to consist of a mixture of the ilmenite-type oxide, $CoMnO_3$, and a spinel having $a_0=8.31$ A.

Example 8

A mixture of 8.73 parts of cobalt nitrate hexahydrate and 10.74 parts of a 50% aqueous solution of manganese nitrate is placed in a heat-resistant glass tube in an electric furnace. The temperature of the furnace is raised to 100 to 250° C. for a period of about 4½ hours. The furnace is then cooled to room temperature. Oxygen is passed through the tube during the entire heating and cooling cycles. The reaction product is a black, frothy solid amounting to 4.80 parts. This product is powdered by grinding lightly in an agate mortar and 1 part of the product is then heated at 600° C. under 200 atmospheres' oxygen pressure for 3 hours. The resulting product amounts to 0.99 part and is a dark gray, strongly magnetic powder. This powder exhibits a Curie temperature of 119° C. and a coercive force of more than 1200 oersteds. X-ray examination shows this product to have the ilmenite-type crystal structure.

Example 9

A mixture of 1 part of the product produced in the first stage of Example 8, i.e., the product obtained from the mixture of cobalt nitrate and manganese nitrate heated at 100–250° C. for 4½ hours in the presence of oxygen, is mixed with 0.15 part of lithium fluoride and 0.83 part of lithium sulfate. The mixture is placed in an open platinum tube, and then heated at 600° C. under 900 atmospheres' oxygen pressure for 3 hours. After cooling and removal from the platinum tube, the reaction product is washed thoroughly with water to remove the fluxing salt, and is then dried. There is obtained 1.05 parts of a black, magnetic, ilmenite-type cobalt-manganese oxide having a Curie temperature of 118° C.

Example 10

A mixture of 4.36 parts of cobalt nitrate hexahydrate, 2.91 parts of nickel nitrate hexahydrate, and 8.95 parts of a 50% aqueous solution of manganese nitrate is heated in a fused silica boat in an electric furnace in an atmosphere of oxygen. A temperature of 200–260° C. is maintained for approximately 3 hours. The contents of the boat are broken up and transferred to a platinum crucible which is placed in a pressure vessel and heated to 600° C. for 3 hours under a pressure of 400 atmospheres of oxygen. After cooling there is isolated from the platinum crucible 1.3 parts of a black, magnetic solid having a Curie temperature of 135° C. This Curie temperature indicates that the product is a mixed nickel-cobalt manganese oxide. X-ray analysis shows the product to have an ilmenite-type crystal structure.

Example 11

A mixture of 0.93 part of manganous fluoride, 1.69 parts of cobaltous fluoride tetrahydrate, 0.39 part of lithium fluoride and 2.26 parts of lithium sulfate is placed in a platinum tube closed at one end and heated at 595–610° C. under an oxygen pressure of 900–1000 atmospheres for 3 hours. The product is extracted repeatedly with boiling water to remove water-soluble constituents and then further purified magnetically. The purified product is a gray, strongly magnetic solid composed of tiny sparkling crystals. It has a Curie temperature of 120° C., characteristic of $CoMnO_3$, and X-ray examination confirms the presence of an ilmenite-type crystal structure. After exhaustive extraction with hot water in a Soxhlet extractor, the fluorine content is found to be less than 0.35%.

The ferromagnetic, ilmenite-type oxides of manganese with cobalt and/or nickel prepared by the process of this invention are useful in many applications in which magnetic oxides are normally employed. For example, they are useful as the magnetic coatings of magnetic recording tapes and as magnetic core materials such as coil core materials for use in electronic equipment.

Since obvious modifications in this invention will occur to those skilled in the chemical arts, I propose to be bound solely by the appended claims.

The embodiments of the invention in which an exclusive property or privilege is claimed are defined as follows:

1. The process for preparing a ferromagnetic crystalline complex oxide of manganese and at least one metal of the group consisting of nickel and cobalt, said oxide having an ilmenite-type crystal structure which comprises heating, at about 450–800° C., at a pressure of less than about 500 atmospheres and in the presence of oxygen a mixture of (1) a manganese salt selected from the group consisting of potassium permanganate and manganese nitrates, oxalates, halides and carbonates and (2) at least one member of the group consisting of nickel and cobalt nitrates, oxalates, halides and carbonates, the atomic ratio of manganese to the other metal in the mixture being between 1:1 and 2:1 when there are salts of only two metals therein and the manganese salt forming 15–85 mole percent of the mixture when there are salts of three metals therein.

2. The process of claim 1 accomplished in an aqueous reaction medium.

3. The process of claim 1 accomplished in the presence of an inorganic flux which promotes the fusion of the reactants, said inorganic flux being selected from the group consisting of boric acid, boric oxide, sodium tetraborate, potassium persulfate, sodium nitrate, aluminum chloride, potassium acid sulfate, sodium hydroxide, potassium hydroxide, lithium nitrate and lithium fluoride/sodium fluoride, lithium fluoride/lithium sulfate and lithium fluoride/potassium fluoride mixtures.

4. The process for preparing a ferromagnetic crystalline oxide of manganese and nickel having an ilmenite-type crystal structure which comprises heating together, at about 450–800° C., at a pressure of less than about 500 atmospheres and in the presence of oxygen, a mixture of nickel and manganese nitrates, the atomic ratio of manganese to nickel in the mixture being between 1:1 and 2:1.

5. The process for preparing a ferromagnetic crystalline oxide of manganese and nickel having an ilmenite-type crystal structure which comprises heating together, at about 450–800° C., at a pressure of less than about 500 atmospheres and in the presence of oxygen, a mixture of nickel and manganese carbonates, the atomic ratio of manganese to nickel in the mixture being between 1:1 and 2:1.

6. The process for preparing a ferromagnetic crystalline oxide of manganese and nickel having an ilmenite-type crystal structure which comprises heating together, at about 450–800° C., at a pressure of less than about 500 atmospheres and in the presence of oxygen, a mixture of potassium permanganate, a manganese halide and a nickel halide, the atomic ratio of manganese to nickel in the mixture being between 1:1 and 2:1.

7. The process for preparing a ferromagnetic crystalline oxide of manganese and cobalt having an ilmenite-type crystal structure which comprises heating together, at about 450–800° C., at a pressure of less than about 500 atmospheres and in the presence of oxygen, a mixture of cobalt and manganese nitrates, the atomic ratio of manganese to nickel in the mixture being between 1:1 and 2:1.

8. The process for preparing a complex ferromagnetic crystalline oxide of manganese, cobalt and nickel having an ilmenite-type crystal structure which comprises heating together at about 450–800° C., at a pressure of less than about 500 atmospheres and in the presence of oxygen, a mixture of cobalt, nickel and manganese nitrates, the manganese salt forming between 15 and 85 mole percent of said mixture.

References Cited in the file of this patent

UNITED STATES PATENTS

| | | |
|---|---|---|
| 1,976,230 | Kato et al. | Oct. 9, 1934 |
| 1,997,193 | Kato et al. | Apr. 9, 1935 |
| 2,283,250 | Goldschmidt et al. | May 19, 1942 |
| 2,436,005 | Hopps et al. | Feb. 17, 1948 |
| 2,547,406 | Morin | Apr. 3, 1951 |
| 2,565,111 | Albers-Schoenberg | Aug. 21, 1951 |
| 2,626,445 | Albers-Schoenberg | Jan. 27, 1953 |
| 2,700,023 | Albers-Schoenberg | Jan. 18, 1955 |
| 2,703,354 | Wainer | Mar. 1, 1955 |
| 2,705,701 | Crowley | Apr. 5, 1955 |
| 2,723,239 | Harvey | Nov. 8, 1955 |
| 2,736,708 | Crowley et al. | Feb. 28, 1956 |
| 2,770,523 | Toole | Nov. 19, 1956 |
| 2,773,039 | Albers-Schoenberg | Dec. 4, 1956 |
| 2,996,457 | Swoboda | Aug. 15, 1961 |

FOREIGN PATENTS

| | | |
|---|---|---|
| 524,097 | Belgium | Nov. 30, 1953 |
| 644,639 | Great Britain | Oct. 18, 1950 |
| 739,069 | Great Britain | Oct. 26, 1955 |
| 740,894 | Great Britain | Nov. 23, 1955 |
| 763,809 | Great Britain | Dec. 19, 1956 |